No. 640,601. Patented Jan. 2, 1900.
G. E. THOMAS.
APPARATUS FOR GAS ANALYSIS.
(Application filed Mar. 23, 1899.)
(No Model.) 2 Sheets—Sheet 1.
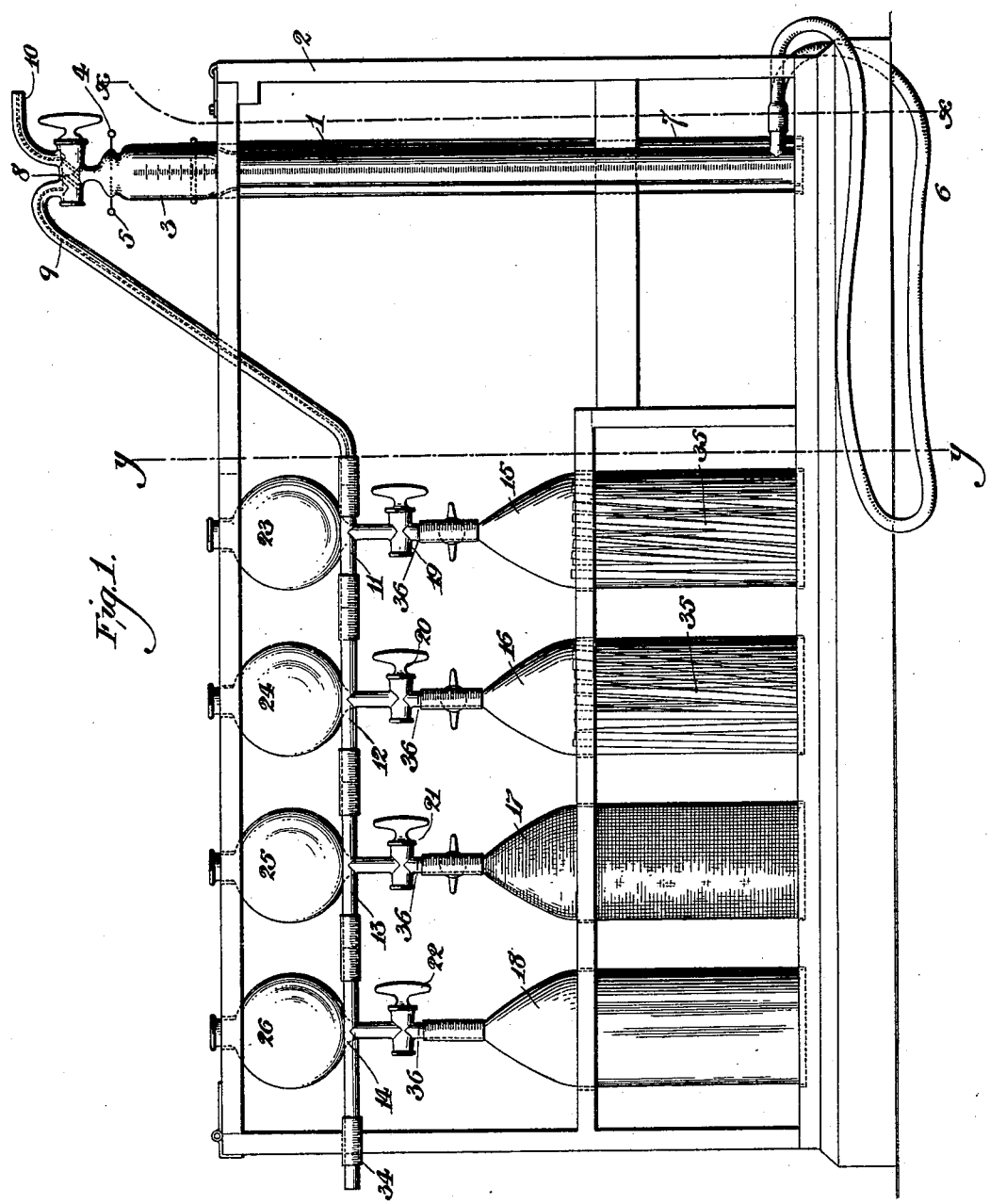

No. 640,601. Patented Jan. 2, 1900.
G. E. THOMAS.
APPARATUS FOR GAS ANALYSIS.
(Application filed Mar. 23, 1899.)
(No Model.) 2 Sheets—Sheet 2.
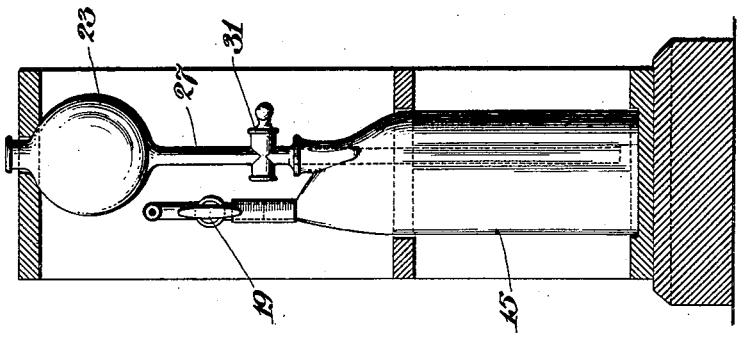
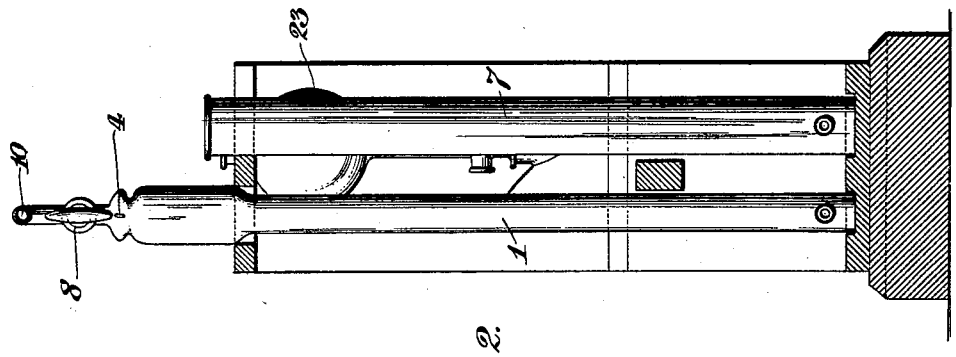
WITNESSES: INVENTOR
Mae Hoffmann George Edward Thomas
John N. Reeve Jr. BY
ATTORNEY

UNITED STATES PATENT OFFICE.

GEORGE EDWARD THOMAS, OF PHILADELPHIA, PENNSYLVANIA.

APPARATUS FOR GAS ANALYSIS.

SPECIFICATION forming part of Letters Patent No. 640,601, dated January 2, 1900.

Application filed March 23, 1899. Serial No. 710,147. (No model.)

*To all whom it may concern:*

Be it known that I, GEORGE EDWARD THOMAS, a citizen of the United States, residing at Philadelphia, in the county of Philadelphia and State of Pennsylvania, have invented a new and useful Gas-Analysis Apparatus, of which the following is a specification.

My invention relates to gas-analysis apparatus; and my object is to provide compact, convenient, and efficient means for the analysis of gas by absorbtion and explosion without removing the gas from the system of apparatus and without separating any of the component parts of said apparatus, by which means the time required in performing the analysis is economized and the loss of gas is prevented.

My invention also comprises certain improvements in details of construction.

As a specific example of my invention I have shown in the drawings and will now describe a device adapted for the analysis of illuminating-gas.

Referring to the drawings, Figure 1 is a side elevation of my device. Fig. 2 is a vertical cross-section on the line $xx$ of Fig. 1, and Fig. 3 is a vertical cross-section on the line $yy$ of Fig. 1.

Similar numerals refer to similar parts throughout the several views.

The measuring-burette 1 is supported in a vertical position in the rack 2. This burette is graduated to one hundred cubic centimeters, the enlarged portion 3 of the burette having unit cubic-centimeter graduations, while the remainder of the graduations are in fifths of a cubic centimeter. Into the upper end of the enlarged portion 3 of the burette, about one-half inch from the top, extend platinum terminals 4 and 5, for the purpose hereinafter explained.

The burette is connected at its lower end by the flexible tubing 6 with the leveling-tube 7. This leveling-tube 7 is supported in the rack when not in use, as shown in Fig. 2, but is adapted to be removed therefrom, as hereinafter described. At the upper end of the burette is provided the three-way cock 8, having one way connected with the capillary tube 9 and another way connected with the capillary tube 10, which is adapted to be connected with the gas-supply. The capillary tube 9 is connected by rubber joints with the capillary T-tube 11, this with capillary T-tubes 12, 13, and 14, which are connected, respectively, by rubber joints with the absorption bottles or reservoirs 15, 16, and 17 and the storing bottle or reservoir 18. The capillary T-tube 14 has at its free end the rubber stopper 34, for the purpose hereinafter described. Intermediate the T's and the bottles, respectively, with which each capillary T-tube is joined, are the stop-cocks 19, 20, 21, and 22. Upon the T-tubes just above the cock are horizontal marks or scratches 36 for the purpose of indicating the normal uniform height at which the liquids should stand when all the gas has been returned to the burette.

Back of the capillary T-tubes are the funnels 23, 24, 25, and 26, which are open at the top and are connected with the bottles 15, 16, 17, and 18, respectively, by tubes 27, one only being shown in Fig. 3, which extend from the bottoms of said funnels to near the bottoms of the bottles, as shown in Fig. 2.

The funnel-tubes 27, which extend into the absorption-bottles 15, 16, and 17, are provided with the stop-cocks 31, 32, and 33, respectively. The funnel-tube extending into storing-bottle 18 has no stop-cock. It will also be noted that the interior surrounding walls of the bottles are flush with these tubes 27, so that there are no depressions or cavities for the accumulation of gas or air. The bottles are filled, respectively, as follows: 15 with an aqueous solution of caustic potash, 16 with water saturated with bromin, 17 with phosphorus sticks in water, and 18 with water.

The absorption-bottles 15 and 16 are filled with glass rods or tubes 35 for the purpose of giving greater surface. The absorption-bottle 17 has an opaque covering to protect the phosphorus contained therein from the action of the light.

It will be obvious from an inspection of the drawings that the whole system of apparatus is suitably contained in a rack. This may be fitted into a box or suitable casing for convenient transportation.

Having now described the apparatus, I will describe the method of its use.

Turning the three-way cock 8 so as to connect tube 10 with the burette, the leveling-tube 7, which is partly filled with water, is removed from the rack and elevated until sufficient water flows therefrom into the burette to completely fill the same and the capillary tube 10. Then, after connecting tube 10 with the gas-supply, the leveling-tube is lowered until the water falls below the required level, preferably the one-hundred-cubic-centimeter point in the burette, the gas filling the space therein left by the water that has been withdrawn. Communication between the burette and tube 10 is then closed by turning stop-cock 8, and tube 10 is disconnected from the gas-supply. The leveling-tube is then elevated slightly, and by partially opening again the passage between the burette and tube 10 the gas is permitted to escape slowly until the water rises to the desired point—as, for instance, the one-hundred-cubic-centimeter point above mentioned. In this way a precise measurement of the gas to be analyzed is obtained. Upon the water reaching the point desired, as above described, the three-way stop-cock 8 is turned to close the communication between the burette and tube 10, and communication between the burette and the capillary tube 9 is opened, and the stop-cock 19 is also opened, so that communication is established between the burette, through the capillary tube 9 and the capillary T-tube 11, and the absorption-bottle 15. Communication is also opened between the absorption-bottle 15 and its funnel 23 by turning stop-cock 36. The leveling-tube 7 now being raised, the water flows into the burette, forcing the gas therefrom into the absorbing-bottle 15, thereby forcing its liquid contents in the funnel 23. The gas thus comes in contact with the caustic-potash solution which still clings to the wall of the bottle and the surface of the tubes, whereby the carbon dioxid contained in the gas is absorbed. The leveling-tube now being lowered, the gas returns to the burette, the leveling-tube being held for a moment with the water-levels of the tube and the burette even in order to prevent reduced pressure or partial exhaustion in the capillary system. Having also observed that the liquid in the bottle has risen to the scratch "36" on the T-tube, which indicates that all the gas has been returned to the burette, communication between the burette and tube 9 is now closed, and by reading the diminished bulk of gas, as indicated by the graduation at which the water stands, the amount of carbon dioxid which was contained in the gas and which was absorbed by the caustic-potash solution is ascertained. This operation is repeated with respect to the absorption-bottles 16 and 17 in a similar manner by first closing the stop-cock 19 of the bottle 15 and the subsequent proper manipulation of the respective stop-cocks of bottles 16 and 17 and the stop-cocks of their respective funnel-tubes.

With respect to bottle 16 the bromin vapor remaining in the gas after the absorption of the illuminants is eliminated by passing the gas for the second time into bottle 15. The gas is then returned to the burette and the reading of the loss of illuminants is made. With respect to bottle 17 the quantity of oxygen absorbed is ascertained. When the gas has thus been treated by the different absorbents and the results noted, the residue may then be stored in a similar manner in storing-bottle 18, and such quantities as may be needed may be introduced therefrom into the burette. The residue of the gas now being stored in the bottle 18, a certain amount of air or air and oxygen—for example, eighty cubic centimeters—is introduced into the burette through tube 10. The passage between the burette and the tube 10 is then closed, and a suitable amount of gas—for example, fifteen to seventeen cubic centimeters—is also introduced into the burette from bottle 18. The air and the gas are then passed into bottle 15 for the purpose of mixing the same together, and the mixture is then returned to the burette. The communication between the tube 9 and the burette is now closed, the leveling-tube is lowered slightly to reduce the pressure, and the tubing 6 is then closed by doubling and securing in a slot in the case or by a pinch-cock or in any other suitable way. The platinum terminals 4 and 5 are now connected with a current of electricity to cause an electric spark within the burette, which ignites the mixture of gas and air and causes the explosion of the same. The gases present are burned to carbon dioxid and water. The total contraction resulting and the subsequent absorption of $CO_2$ furnish sufficient data for the calculation of carbon monoxid, hydrogen, methane, &c.

Suitable lubricants are used for the stopcocks. The whole capillary system can readily be cleansed by removing cap 34 and forcing a suitable solvent therethrough from the burette.

I consider it a great improvement to have dispensed with the U-tubing heretofore commonly connected with the bottoms of absorbing-reservoirs by introducing and withdrawing both the gas and the fluid into and from each bottle through the top thereof. By employing the detachable T-tubes as shown, the various parts may be readily removed and replaced, in case of becoming in any way unsuitable for use.

What I claim is—

1. In a gas-analysis apparatus the combination with a burette of a plurality of absorption-reservoirs and a storing-reservoir, all connected with the burette by capillary tubing, each reservoir provided with a funnel having a funnel-tube extending downward through the top of the reservoir to near the bottom of same and means for raising and lowering liquid in the burette to cause the introduction therefrom of gas into the reservoirs to the displacement of liquid therefrom and the withdrawal of the gas from the reservoirs back into the burette substantially as described.

2. In a gas-analysis apparatus the combination with a burette of a plurality of absorption-reservoirs and a storing-reservoir, all connected with the burette by capillary tubing, each reservoir provided with a funnel having a funnel-tube extending downward through the top of the reservoir to near the bottom of same, means for raising and lowering liquid in the burette to cause the introduction therefrom of gas into the reservoirs to the displacement of liquid therefrom and the withdrawal of the gas from the reservoirs back into the burette and means connected with the funnel-tube for opening and closing communication between the funnel and reservoir, separate means respectively for opening and closing communication between the reservoirs and the capillary tubing, substantially as described.

3. In a gas-analysis apparatus the combination with a burette of a plurality of absorption-reservoirs and a storing-reservoir, all connected with the burette by capillary tubing, each reservoir provided with a funnel having a funnel-tube extending downward through the top of the reservoir to near the bottom of same, means for raising and lowering liquid in the burette to cause the introduction therefrom of gas into the reservoirs to the displacement of liquid therefrom and the withdrawal of the gas from the reservoirs back into the burette, and means connected with the funnel-tube for opening and closing communication between the funnel and reservoir, separate means respectively for opening and closing communication between the burette and the capillary tubing and between each of the reservoirs and the capillary tubing, substantially as described.

4. In a gas-analysis apparatus the combination of a burette and leveling-tube as means for separating from the gas-supply a definite amount of gas for analysis and for introducing and withdrawing the same from the reservoirs, a plurality of reservoirs connected by capillary tubes with the burette, funnels connected with the reservoirs by funnel-tubes extending through the tops thereof to near the bottoms of same, and means for exploding the residuum of gas in the burette after the absorption process, substantially as described.

5. In a gas-analysis apparatus the combination with a burette of a leveling vessel as means for raising and lowering liquid in the same, a tube connected with the burette as means for detachably connecting the burette with the gas-supply, a plurality of reservoirs connected with the burette, and a funnel connected with each reservoir through the top thereof for containing the liquid forced from the reservoir by the introduction therein of gas, substantially as and for the purposes described.

6. In a gas-analysis apparatus the combination of a measuring-burette and a leveling-tube connected together at their lower ends by a flexible tubing, means for connecting the burette with the gas-supply, a plurality of absorption-reservoirs and a storing-reservoir, detachably connected with each other and the burette by separable capillary T-tubes, each reservoir provided with a funnel having a funnel-tube extending through the top of the reservoir to near the bottom of the same, means connected with the funnel-tubes between each absorption-reservoir and its respective funnel for opening and closing communication between the same, and means for opening and closing communication between each reservoir and the capillary tubing and means for opening and closing communication between the burette and the tubing and for opening and closing communication between the burette and gas-supply, substantially as and for the purpose described.

7. In a gas-analysis apparatus the combination with a burette provided with electric terminals, of a plurality of reservoirs connected with the burette by capillary tubing, each reservoir provided with a superimposed funnel having a tube therefrom extending downward through the top of the reservoir to near the bottom of the same and means for raising and lowering liquid in the burette, substantially as described.

GEORGE EDWARD THOMAS.

Witnesses:
JNO. STOKES ADAMS,
MAE HOFFMANN.